June 12, 1962    H. G. KLEMM ET AL    3,038,419
APPARATUS FOR FORMING PELLETS OF HAY OR THE
LIKE UNDER FIELD CONDITIONS
Filed July 15, 1959     3 Sheets-Sheet 3

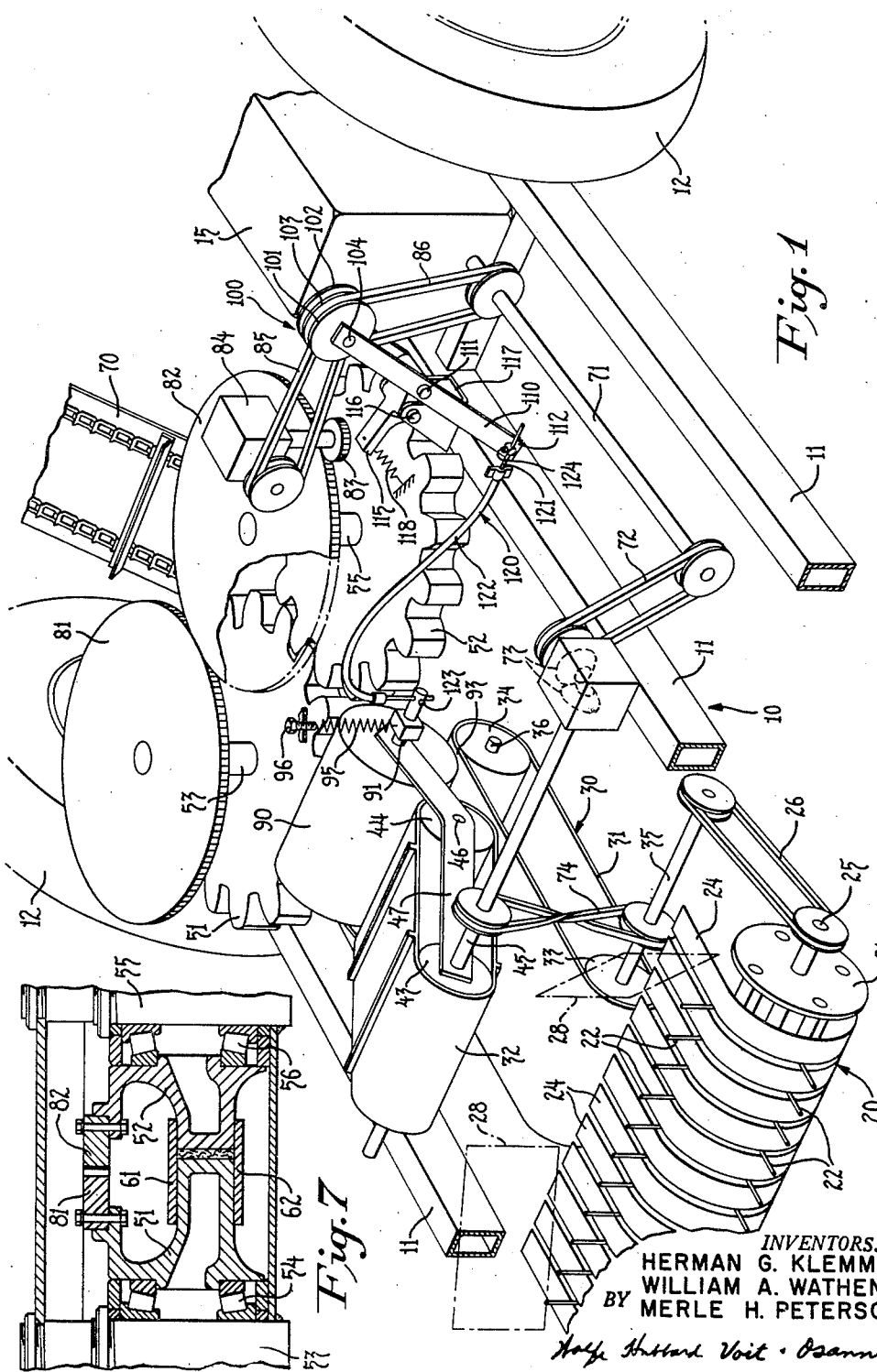

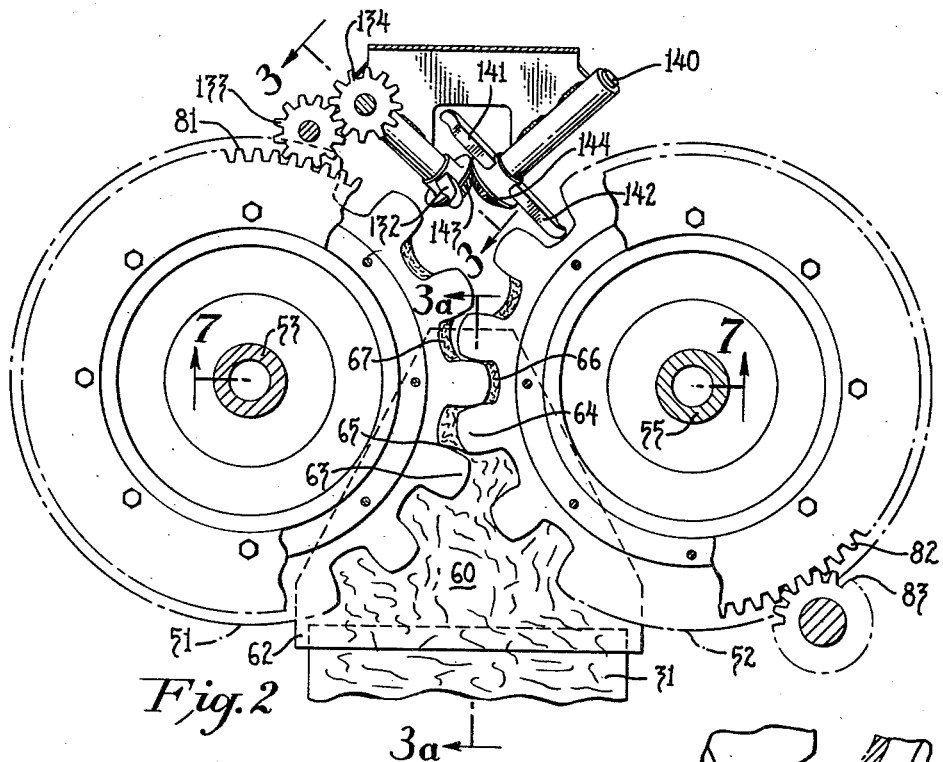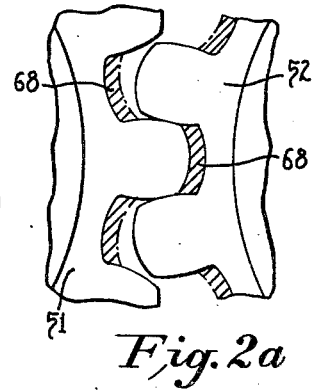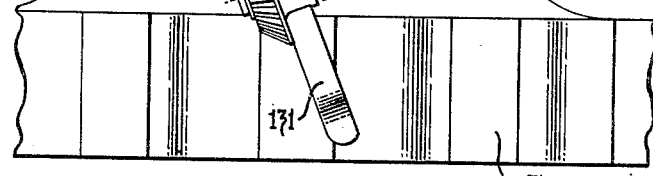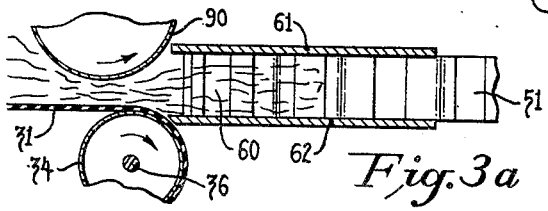

INVENTORS.
HERMAN G. KLEMM,
WILLIAM A. WATHEN &
BY MERLE H. PETERSON

ATTORNEYS.

United States Patent Office 3,038,419
Patented June 12, 1962

3,038,419
APPARATUS FOR FORMING PELLETS OF HAY OR THE LIKE UNDER FIELD CONDITIONS
Herman G. Klemm, Birmingham, William A. Wathen, Detroit, and Merle H. Peterson, Livonia, Mich., assignors to Massey-Ferguson Inc., Racine, Wis., a corporation of Maryland
Filed July 15, 1959, Ser. No. 827,354
19 Claims. (Cl. 107—8)

The present invention relates to pelletizing a fibrous material and more particularly to the pelletizing of hay picked up from a windrow.

The tonnages of hay required in the operation of an average farm, and the fluffy nature of hay, has long presented problems of harvesting, collecting and storage. To reduce the bulk in an effort to reduce the man hours per ton required from field to manger, the practice of bailing from the windrow is almost universal. However, the bales are usually dumped back onto the field and they must later be manually loaded, transported to the barn, and stacked for storage. In use, the bales must be manually unstacked, broken apart, and put into the manger. It has been suggested in the past that hay be pelletized rather than baled. Handling of hay in pellet form is advantageous because of the possible use of machines to take care of all of the steps mentioned above, including the possibility of employing automatic conveyors from the storage bin to the feed rack. However, no machine capable of producing pellets of uniform size, shape and density under field conditions, and satisfactory for use on an average farm, has been available.

Accordingly, it is an object to produce a hay pelletizing machine capable of receiving hay from a windrow and for producing hay pellets of uniform size and shape and predetermined density on a high production basis and in spite of wide variations in the amount of the hay in the windrow.

More specifically, it is an object to provide a hay pelletizing machine capable of operating in the field to produce hay pellets which are sufficiently dense and compact as to hold their shape in spite of handling in automated conveyor equipment but which are nevertheless sufficiently tender and spongy as to be palatable to livestock. Tests indicate that livestock actually prefer the pelletized hay produced by the present machine to the loose fibrous hay from the field or bale.

It is a more specific object of the present invention to provide a hay pelletizing machine in which the charge of hay to be formed into a single pellet is automatically controlled within relatively narrow limits so that sufficient plant juices are liberated to bind the compressed fibers together thereby to withstand a reasonable amount of handling in bulk while, nevertheless, preserving a spongy texture free of hard spots and which is palatable and in optimum condition for eating by livestock.

It is a further object to provide a hay pelletizing machine producing pellets which are well formed and separate from one another and in which the trailing fibers are severed or pinched off incident to compressing the pellet into final shape.

It is still another object to provide a hay pelletizing machine which insures that the hay being fed to the pellet forming gears is of substantially constant per-unit density to enhance the production of uniform pellets in spite of wide variation in the amount of hay being fed into the machine from the windrow.

It is yet another object to provide a pelletizing machine which is simple and reliable in operation and which is not readily thrown out of kilter by the picking up of some foreign object along with the hay in the windrow. It is another object to provide a hay pelletizing machine which is safe to operate and in which all of the moving parts may be enclosed, quite unlike the balers in common use.

Finally, it is an object of the invention to provide a hay pelletizing machine capable of use in the field, either self-propelled or tractor-drawn, which is durable and long lived, which consists of a minimum number of simply formed parts and which may be produced at a cost which is so low as to justify purchase by farmers operating relatively small acreage.

Other objects and advantages of the invention will become apparent upon reading the attached detailed description and upon reference to the drawings in which:

FIGURE 1 is a diagrammatic perspective, simplified for easy understanding, of a hay pelletizing machine constructed in accordance with the present invention;

FIG. 2 is an enlarged fragmentary top view of the pelletizing gears and knocker arms;

FIG. 2a is an enlarged fragmentary profile of the meshing gears with the relieved pockets therein shown by the shading;

FIG. 3 is an enlarged fragmentary detailed view showing a knocker shaft and associated knocker arms taken along the line 3—3 in FIG. 2;

FIG. 3a is a vertical fragmentary section taken along the line 3a—3a in FIG. 2;

FIG. 7 is a fragmentary section of the pellet-forming gears and associated timing gears taken along the line 7—7 in FIG. 2, on a reduced scale.

Figure 4:
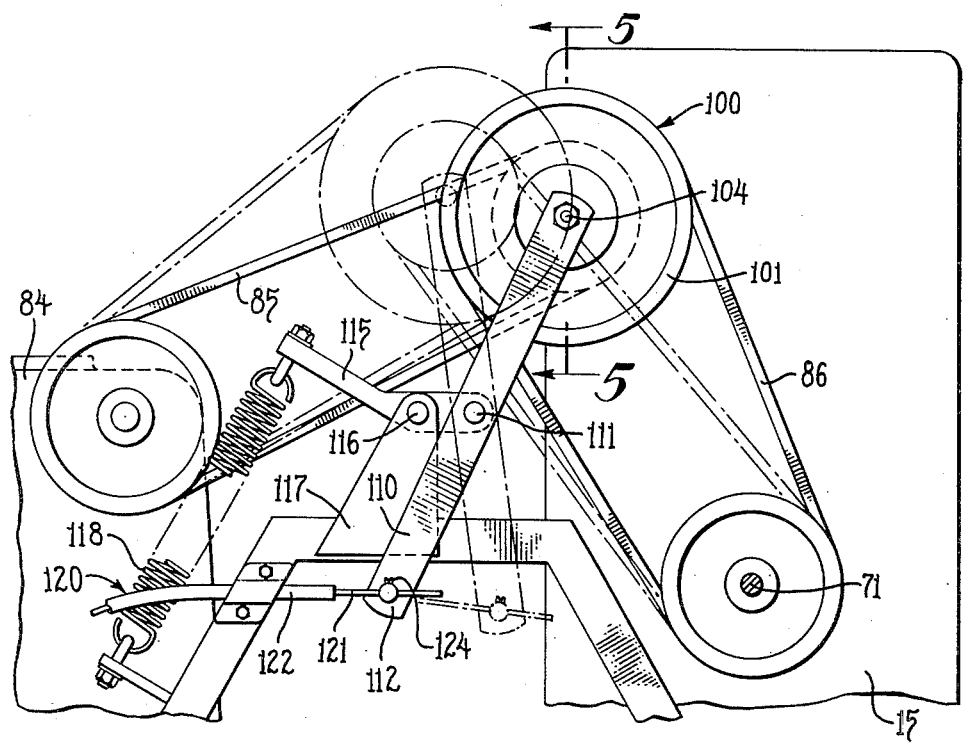
FIG. 4 is a fragmentary view of the ratio adjusting mechanism, with the alternate limit of adjustment indicated by the dot-dash outline.

While the invention is described herein in connection with a preferred embodiment, it will be understood that I do not intend to be limited to such embodiment, but, on the contrary, intend to cover the various alternative and equivalent constructions included within the spirit and scope of the appended claims.

Turning now to the drawings, FIGURE 1 shows a pelletizing mechanism in partially exploded and semi-diagrammatic form. While the details are brought out in the accompanying figures, it will be possible to visualize the operation of the machine quite graphically from this figure. The machine, which is intended for use out in the field, includes a frame 10 for transport having a number of longitudinal elements or rails 11 and supported by suitable ground engaging wheels 12 of which only two are shown in the drawing, located on opposite sides of the frame. The present pelletizing machine may be either self-propelled or tractor-drawn; in the present instance, it will be assumed that the machine is self-propelled with a suitable driving connection being provided between an engine 15 and the wheels 12.

Mounted at the left, or front, end of the machine is a hay pick-up device 20 which will be recognized as being of conventional type. It includes a reel 21 having sets of fingers 22 which extend through slits 23 in a curved apron 24. The reel 21 is rotated by a drive shaft 25 which is driven by a belt 26 coupled to the engine 15 by means to be described. It will be apparent that as the machine is advanced into the windrow, the hay in the windrow will be picked up by the fingers 22 and passed rearwardly across the apron 24. As the hay moves, it is directed toward the center by a pair of guide plates 28 to facilitate feeding to a conveyor at the point of discharge.

Mounted at the rear of the apron 24 and centered with respect to the guide plates 28 is a conveyor generally indicated at 30. This conveyor includes lower apron type conveying means 31 and upper conveying means 32 in the form of endless, cleated belts. The belt 31 is trained about horizontal rollers 33, 34, respectively, having shifts 35, 36. The upper conveyor belt 32 is trained about rollers 43, 44 having shafts 45, 46. Such shafts are preferably mounted on a pair of downwardly angled arms 47 so that the two conveyor belts 31, 32 are convergent for reducing the volume occupied by the hay and for forming it into an integrated stream or "batt."

In carrying out the present invention, a pair of meshed pelletizing gears are provided at the output of the conveyor 30 for receiving the batt of hay issuing from the conveyor, for severing or "pinching off" charges for individual pellets, and for compressing such charges to a degree just sufficient to liberate the plant juices throughout the body of the pellet so that the pellet will be palatable yet hold together when handled in bulk. In the present instance, the gears indicated at 51, 52, are arranged horizontally in a common plane. For the details of construction of the gears, reference is made to FIGS. 2, 2a and 7. Taking the gear 51 by way of example, it is preferably of hollow construction (FIG. 7) mounted on a shaft 53 on antifriction roller bearings 54. The gear 52 is of similar construction mounted on a shaft 55 and having antifriction roller bearings 56.

For the purpose of providing a horizontally convergent feed chamber 60 at the entry way of the gears and to prevent the hay from simply being extruded upwardly and downwardly as it is compressed, the gears are embraced by upper and lower cover or guide plates 61, 62 (FIGS. 3a and 7) which are suitably anchored to the machine frame. These cover plates are preferably triangular in shape, extending from the outlet of the conveyor to a point slightly beyond dead center.

In practicing the invention, the batt of hay received from the conveyor undergoes three definable steps in conversion to pellet form, horizontal compression or densifying, pinching off of individual charges, and final compaction. Thus, referring to FIG. 2, it will be seen that the gear teeth which form the convergent "side walls" of the feed chamber 60 act as a series of feed fingers which are offset from one another and which seize both sides of the advancing mass compressing it horizontally and pulling it inwardly toward the dead center position. At this time, the hay is in the form of matted fibers. In accordance with one of the aspects of the invention, closely spaced involute gears are employed to insure cutting off of the trailing fibers. The involute shape is distinguished by the fact that there is sliding "line contact" between the meshing gears as they begin to mesh. Specifically, the tip of a tooth on one gear and the wall of a tooth on the other come together with substantially zero clearance in advance of the time that the dead center position is reached. Thus, referring to FIG. 2, it will be noted that a tooth 63 on the gear 51 cooperates with an adjacent tooth 64 on the gear 52 with initial contact taking place at 65. This coming together not only defines the charge but severs or pinches off any trailing fibers which might otherwise cause the pellets to be connected to one another. After this pinching off occurs, and as the gear teeth move into the dead center position, final compression takes place until the pellet occupies minimum volume as shown at 66. As the pressure is released, the pellet will tend to remain in the space between the teeth as indicated at 67, and it is one of the features of the present invention that novel means are provided for knocking out the pellets as the gears continue to rotate.

It will be apparent from what has already been said that the pockets for forming the pellets are not produced simply by spacing apart at the meshed gears by an appropriate amount. On the contrary, the gears are fully meshed with their pitch diameters coincident with one another. The pockets, indicated at 68 in FIG. 2a, are formed by undercutting or relieving the gear at the roots between the adjacent teeth. The portion of the gear which is removed incident to this undercutting or relieving is indicated in the shading in FIG. 2a.

After the pellets have been knocked out by means to be described, they are preferably elevated into a storage bin by means of a conventional elevator 70.

It will be seen that in the above arrangement, the hay is first slightly compressed in the vertical direction by the convergent conveyor means and then subsequently compressed an additional amount in the horizontal direction between the gear cover plates 61, 62 by the crowding action of the gear teeth as they sweep around into dead center position. This compression in two planes insures that a fairly dense charge will be fed into the mating gear teeth as they are about to close, so that the final, pellet-forming, step is accomplished with only a limited compression ratio. Thus, the space between the mating teeth at the time that the charge is cut off or defined may bear a ratio to the pellet volume of only about 2:1. This permits the formation of pellets of reasonable size while keeping to a minimum the size of the gears required to produce them, thus cutting down upon the size and weight of the total machine.

In carrying out the present invention, a common source of rotative power is provided for driving both the conveyor 30 and the pellet forming gears 51, 52. Accordingly, reference may next be made to the driving means. Projecting from the engine 15 and rotating at a speed which is suitably stepped down by gearing (not shown) associated with the engine, is a drive shaft 71. Such drive shaft engages a belt 72 at its end for driving bevel gearing 73 which rotates the shaft 45 associated with the upper conveyor. A twisted belt 74 is employed to interconnect the shaft 45 and the shaft 35 associated with the lower conveyor so that both of the conveyors are operative to propel the incoming hay. The pick-up device 20 is also powered by the same power conveying elements, the belt 26 serving to interconnect the shaft 35 of the lower conveyor with the shaft 25 of the pick-up device.

For the purpose of driving the pellet forming gears 51, 52, the gears are provided with integral timing gears 81, 82, respectively, having the same pitch diameter and which are in mesh with one another (FIG. 7). These are preferably in the form of "ring" gears bolted or otherwise secured to the pellet forming gears. For driving the gear 82, a spur gear 83 is used driven by a speed reducer 84 which, in turn, is driven by belts 85, 86 from the engine drive shaft 71.

In accordance with the present invention, automatic means are provided for controlling the speed of the pellet forming gears 51, 52 in accordance with the amount of hay being fed to such gears. Stated in more specific terms, means are provided for slightly compressing the hay passing through the conveyor means 30 to form a batt of substantially uniform density, for measuring the thickness of the batt, and for using the measurement of thickness to control the speed of the pellet forming gears.

In the preferred embodiment of the invention, a batt of constant per-unit density is formed by providing a convergent conveyor arrangement in which one side of the conveyor is biased to produce a predetermined compressive force upon the passing stream of hay. Thus, as shown in the drawings, the upper conveyor is hinged about the horizontal shaft 45 for bodily swinging movement about its inlet end, and the remainder of the conveyor is "floating" so that its weight presses downwardly upon the hay. In other words, the conveyor arms are free to swing upwardly and downwardly applying a substantially constant compressive force to the hay and with the position at any given moment depending upon the thickness of the batt.

In accordance with one of the aspects of the invention, a sensing roller is provided at the outlet of the upper conveyor for more precise measurement of the thickness of the batt being fed to the pellet forming gears. In the present instance, the roller, indicated at 90, is mounted at the ends of the arms 47 which support the conveyor rollers. For this purpose, the arms 47 may be bent into dog-leg shape as shown, and antifriction bearings may be provided at 91 to insure that the roller 90 is freely rotatable. Preferably, the sensing roller 90 is so related to the roller 44 which supports the outlet end of conveyor belt 32 that the hay reaches maximum density in the region 93 between the sensing roller and the roller 34 of the lower conveyor, the two rollers being substantially alined with one another in a vertical direction. If desired, most of the weight of the upper conveyor assembly may be borne by the sensing roller 90. In any event, the position of the sensing roller, and the arms 47 which support it, is related directly to the thickness of the batt.

For the purpose of adjusting the amount of force applied to the batt, an adjusting spring may be provided at the lower or movable end of the arms 47. Such a spring, indicated at 95, preferably has a low spring rate and an adjustable anchoring point provided, for example, by an adjustable screw 96. Such spring may be either in tension or compression depending upon whether it is desired to subtract from or add to, the weight applied to the batt of hay by the force of gravity acting upon the swingable upper conveyor assembly, thereby to produce a batt having a desired and substantially constant per-unit density.

Figure 5:
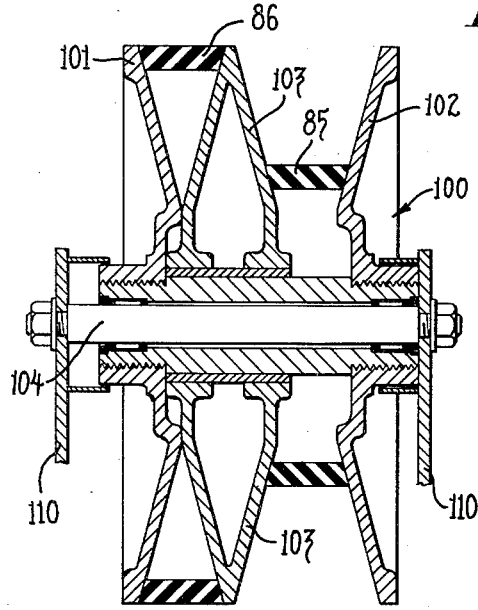
FIG. 5 is a section taken along the line 5—5 in FIG. 4.
Figure 6:
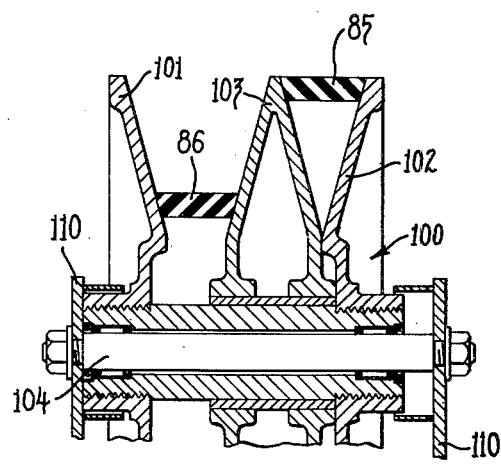
FIG. 6 is a section similar to FIG. 5 but showing the position of the belts in the alternate condition of adjustment.

To bring about a change in the speed of the pellet forming gears while leaving the speed of the conveyor substantially constant, a ratio-changing device 100 is interposed between the engine and the gears. This device, illustrated in FIGS. 4, 5 and 6, is engaged by the belts 85, 86 previously referred to. This ratio changing means is of simple construction, employing a compound pulley having a first fixed wall 101, a second fixed wall 102, and a movable central wall 103. All of these elements rotate as a unit on a central axle 104. As will be understood by one skilled in the power transmission art, the central or movable wall 103 adopts an axial position of equilibrium depending upon the positioning of the axle 104 relative to the two belts 85, 86. To change the position of the axle 104, the same is mounted on a ratio-adjusting lever 110 having a fulcrum 111 and a lower or positioning end 112. To preserve the belt tension for all ratio settings, the lever 110 is floatingly mounted on an auxiliary spring loaded lever 115 having a fulcrum 116 which is supported on the frame of the machine on a suitable bracket 117. A spring 118 connected to the opposite end of the lever 115 produces a counterclockwise torque about the pivot 116 which in turn acts to produce endwise thrust along the lever 110 in a direction to tension both of the belts 85, 86 simultaneously.

For the purpose of linking together the ratio-adjusting lever 110 and the sensing roller 90 for automatic corrective action, any desired mechanical coupling may be employed. However, for simplicity, I prefer to use a so-called "Bowden" wire control 120 having a flexible wire 121 in a stationarily mounted, flexible sheath 122. The ends of the wire 121 are anchored by screws 123, 124, respectively, at least one of these screws preferably being capable of temporary release in order to adjust the relation between the position of the sensing roller and the position of the ratio-changing lever. It will be understood that the density of the batt, which is controlled by the adjustment of the spring 95, and the relative speed of the pellet forming gears 51, 52 relative to the batt are adjustments which are to some extent interrelated, but it is nevertheless a simple matter for one skilled in the art to vary both of the adjustments until a condition is achieved which produces optimum feeding into the pellet forming gears and optimum density of the pellets.

In accordance with one of the more detailed aspects of the present invention, knocker arms, synchronized with the pellet forming gears are provided for knocking the pellets from between the teeth. To understand the knocker arm arrangement, reference is made to FIGS. 2 and 3. Thus, taking the gear 51 by way of example, a knocker arm shaft 130 is provided having a pair of knocker arms 131, 132 at the end thereof. The knocker arm shaft 130 is driven from the timing gear 81 via spur gears 133, 134. The gear 134 is close coupled to a bevel gear 135 which engages a bevel gear 136 mounted at the end of the knocker arm shaft. Thus, rotation of the timing gear 81 produces rotation of the knocker arm shaft 130 so that the arms 131, 132 thereon sweep through the space between successive teeth, thereby knocking the pellets between the teeth clear of the pellet forming gears and to a pick-up point at the foot of the conveyor 70. In similar fashion, the pellet forming gear 52 has a knocker arm shaft 140 having arms 141, 142 thereon. The shafts 130, 140 are coupled together by bevel gears 143, 144 in such a way that the knocker arms are 90° out of phase on the two shafts. Because of the positive coupling between all of the moving elements, perfect synchronism is assured.

Preferably the knocker arm shafts are inclined at an angle "$a$" from the horizontal (FIG. 3) so that the knocker arms have a component of motion in the direction of rotation of the respective pellet forming gears. Thus each arm tends to follow the movement of the teeth, enabling the arms to be rotated at a reduced speed with less likelihood of damaging the pellets.

Resumé of Operation

While the operation of the device will be apparent from the above description, it may be summarized briefly as follows: The machine is driven along a windrow which is bodily picked up by the pick-up device 20 and deposited on the apron 24. Upon striking the guide plates 28, the hay is directed toward the center of the apron 24 and into the mouth of a conveyor mechanism 30 consisting of the belts 31, 32 which move in unison with one another. The conveyors are vertically convergent so that the fluffy hay is progressively and lightly compressed as it travels along. However, the upper conveyor assembly is vertically swingable about the shaft 45, with the assembly being gravity-biased against the hay to produce a somewhat compacted batt of hay which is of substantially constant density but which varies in thickness depending upon the amount of hay being received from the pick-up device. It is understood that the rate of feed of hay under field conditions may vary over wide limits depending upon the yield in the various portions of the field. The hay is further compacted and its thickness constantly measured by the sensing roller 90 which assumes a vertical position depending upon the thickness of the batt. The sensing roller serves to angularly position the speed control lever 110 which establishes a speed ratio in the ratio-changing device 100 with the result that the pellet forming gears are speeded up when a thick batt is being fed from the conveyor and slowed down when the batt is of reduced thickness, thereby to produce pellets of substantially constant density.

When the batt is fed into the feed chamber 60 (FIG. 2) the fibers are engaged by the teeth of the pellet forming gears and compacted horizontally. The batt is also divided into successive "charges." As the teeth of the gears "wipe" together, line contact is achieved and the trailing fibers are pinched off. Each charge is thereupon compressed into a pellet, and on the output side the pellet is knocked clear by a rotating knocker arm which rotates in synchronism with the gear. The pellets may then be conveyed by a suitable conveyor into a bin for transport to the barn. The relative speeds of the conveyor and pellet forming gears may be varied by varying the linkage between the sensing roller and the speed changing mechanism, and the density of the batt may be conveniently varied by varying the force in the auxiliary spring 95.

The pellets produced by the present machine may be stored in bulk and transferred to mangers and feeding stations by suitable automatic conveyors, thereby avoiding the manual labor involved in the handling and usage of bales. The present machine may be used successfully with many different types of hay, and the final product seems to be more attractive to livestock than the hay in the non-pelleted condition.

It will be apparent that the above machine employs a minimum of parts, making it possible for machines of the present design to be produced at a cost sufficiently low to enable use on farms of medium and small size. However, the use of pelleted hay is particularly advantageous on large farms and ranches where full use may be made of automated stock feeding apparatus.

We claim as our invention:

1. In a hay pelletizing machine the combination comprising a transportable frame, means including a conveyor positioned on said frame to receive hay and operative for slightly compressing the hay into a batt of substantially uniform density but of a thickness depending upon the rate of hay received, means including a pair of relieved intermeshing pelletizing gears for receiving the batt formed by said conveyor and for compressing the same in the spaces between the gear teeth to form pellets, means positioned between said conveyor and said gears for sensing the thickness of the batt being fed to the pelletizing gears, means for driving the gears and the conveyor, and means coupled to said sensing means and acting on said driving means for controlling the speed of the gears in accordance with the thickness of the batt for production of pellets of substantially uniform density.

2. In a hay pelletizing machine the combination comprising a transportable frame, means positioned on said frame to receive hay and operative for slightly compressing the hay into a batt of predetermined width but variable thickness, means including a pair of registering pelletizing gears having intermeshing teeth for receiving the batt formed by said compressing means and for compressing the same in the spaces between the gear teeth to form pellets, means positioned ahead of said gears for sensing the thickness of the batt being fed to the pelletizing gears, and driving means coupled to the sensing means for control thereby in driving the pelletizing gears at a speed which varies with the thickness of the batt for production of pellets of substantially uniform density.

3. In a hay pelletizing machine the combination comprising means for conveying the hay and for slightly compressing the hay into a batt of predetermined width and density but variable thickness, means including a pair of registering pelletizing gears having intermeshing teeth for receiving the batt and for compressing the same in the spaces between the teeth to form pellets, means disposed adjacent the discharge end of said conveying means for sensing the thickness of the batt being fed to the pelletizing gears, and driving means for driving the conveying means and said pelletizing gears including variable speed mechanism interposed in the drive for said gears and controlled by said sensing means to drive the gears at a speed which varies with the thickness of the batt for production of pellets of substantially uniform density.

4. In a hay pelletizing machine the combination comprising a transportable frame, means supported on said frame for receiving and slightly compressing gathered hay to form a batt of substantially constant density but of variable cross section, pellet forming means on said frame positioned for receiving the batt formed by said compressing means and for compressing successive portions thereof into separate pellets, means for constantly measuring the cross section of the batt adjacent the point at which it is fed into the pellet forming means, means for driving the pellet forming means, a source of rotative power, a variable ratio driving means interposed between the source of rotative power and the pellet forming means, and means including a linkage actuated by said measuring means for adjusting the variable ratio driving means in accordance with the cross section of the batt being fed to the pellet forming means.

5. In a hay pelletizing machine the combination comprising a transportable frame, upper and lower conveyors on said frame positioned to receive gathered hay, said conveyors being convergently arranged with the upper conveyor being floatingly mounted and weighted so that the gathered hay is slightly compressed to form a batt of substantially constant density but of variable cross section as it is conveyed, pellet forming means on said frame positioned for receiving the batt formed by said conveying means and for compressing successive portions thereof into separate pellets, means for constantly measuring the cross section of the batt adjacent the discharge end of the conveyor before it is fed into the pellet forming means, means for driving the pellet forming means including a source of rotative power, and means included in said driving means and controlled by said measuring means for continuously adjusting the speed of the pellet forming means in accordance with the cross section of the batt formed by said conveyors.

6. In a hay pelletizing machine the combination comprising a transportable frame, a lower apron type conveyor and an upper apron type conveyor arranged on said frame in superimposed relation with their inlet ends positioned to receive hay between them, means for hingedly supporting the upper conveyor at its inlet end on said frame while permitting the outlet end thereof to float with the weight being borne by the hay so that the hay is lightly compressed into a batt of substantially constant density but of variable cross section as it is transported by the conveyor, pellet forming means mounted on said frame in position for receiving the batt discharged from the conveyors and for compressing successive portions thereof into separate pellets, means including a source of rotative power for driving the conveyors and the pellet forming means, a variable ratio driving means interposed between the source of rotative power and the pellet forming means, and means for automatically adjusting the variable ratio driving means in accordance with the angular position of the upper conveyor.

7. In a hay pelletizing machine the combination comprising a transportable frame, a lower apron type conveyor and an upper apron type conveyor arranged on said frame in superimposed relation in position to receive hay between them, means for pivotally supporting the upper conveyor at its inlet end while permitting the outlet end thereof to float with the weight being borne by the hay so that the hay is lightly compressed into a batt of substantially constant density but of variable cross section as it is transported by the conveyors, pellet forming means carried by said frame in position for receiving the batt formed by said conveyors and for compressing successive portions thereof into separate pellets, means for constantly measuring the cross section of the batt formed by the conveyors before it is fed into the pellet forming means, means including a source of rotative power for driving the conveyors and the pellet forming means, a variable ratio driving means interposed between the source of rotative power and the pellet forming means, and means actuated by said measuring means for automatically adjusting the variable ratio driving means in accordance with the cross section of the batt being fed to the pellet forming means.

8. In a hay pelletizing machine the combination comprising a transportable frame, convergent conveyor means supported on said frame in position to receive hay, said conveyor means including opposed elements inwardly biased against the conveyed stream of hay for compressing the hay into a batt of substantially constant density but of variable cross section at it is transported by the conveyor means, pellet forming means supported on said frame in position for receiving the batt formed by said conveyor means and for compressing successive portions thereof into separate pellets, means for constantly measuring the cross section of the batt as it is formed by the conveyor means and fed into the pellet forming means, means including a source of rotative power for driving the pellet forming means and the conveyor means, and means interposed in the drive for the pellet forming means coupled to the measuring means for adjusting the speed of the pellet forming means automatically in accordance with the cross section of the batt being fed to the pellet forming means.

9. In a hay pelletizing machine the combination comprising a transportable frame, convergent conveyors supported on said frame in face to face relation positioned to receive hay between them, a roller on one of the conveyors having means for biasing the same inwardly against the conveyed stream of hay for compressing the hay into a batt of substantially constant density but of variable cross section, pellet forming means positioned for receiving the batt formed by said roller and for compressing successive portions thereof into separate pellets, means operatively connected with said roller for constantly measuring the cross section of the batt fed into the pellet forming means, means including a source of rotative power for driving the pellet forming means and the conveyor means, and means actuated by said measuring means for automatically adjusting the speed imparted to the pellet forming means by said drive means in accordance with the cross section of the batt being fed to the pellet forming means.

10. In a hay pelletizing machine the combination comprising a transportable frame, conveyor means on said frame positioned to receive hay and operative for conveying the hay and for forming the same into a batt of substantially constant density but of variable cross section, pellet forming means on said frame positioned for receiving the batt formed by said conveyor means and for forming successive portions thereof into compressed pellets, common driving means for the conveying means and pellet forming means, and means included in said conveyor means responsive to the cross section of the batt being fed to the pellet forming means operative to regulate said driving means for varying the speed of operation of the pellet forming means for the production of pellets having substantially uniform size and density.

11. In a hay pelletizing machine the combination comprising a transportable frame having a supporting ground wheel, conveyor means on said frame position to receive hay and operative to form the same into a batt of substantially constant density but of variable cross section as it is being transported, pellet forming means on said frame positioned for receiving the batt produced by said conveyor means and for forming successive portions thereof into compressed pellets, common driving means for the conveying means pellet forming means and ground wheel, and means controlled in accordance with the cross section of the batt being fed to the pellet forming means for adjusting said drive means to vary the relative speed of operation of the pellet forming means for the production of pellets having substantially uniform size and density in spite of variations in field conditions.

12. A hay pelletizing machine comprising in combination a transportable frame, pellet forming means on said frame, means on said frame for conveying hay in a stream of substantially constant unit density to said pellet forming means, means operatively connected to said conveying means for measuring the rate of flow of hay in the stream, and means for driving the pellet forming means at a speed which is dependent upon the measurement made by said measuring means so that substantially the same charge of hay is compressed into successively formed pellets.

13. In a hay pelletizing machine the combination comprising a pair of pelletizing gears having meshed teeth, stationary upper and lower cover plates arranged flatly adjacent the opposite sides of said gears and defining with said gears an inwardly tapering feed chamber, means for feeding a batt of hay into said feed chamber so that the teeth converge upon and capture the leading portion of the batt drawing it inwardly and compressing the same, the gears having teeth of involute shape and spaced for full meshing so that a substantially closed pocket is formed prior to arrival at the dead center position resulting in the pinching off of trailing fibers but with the roots of the teeth cut out to define pockets at the dead center position, means for driving the gears at a rate of speed which is dependent upon the rate of feed of hay in the batt, and means for knocking out the pellets from between the teeth as the teeth pass beyond the dead center position.

14. In a hay pelletizing machine the combination comprising a pair of pellet forming gears having meshed teeth providing clearance for the formation of successive pockets at the roots of the teeth as the gears revolve, stationary upper and lower cover plates arranged flatly adjacent the opposite sides of said gears and defining with said cover plates an inwardly tapering feed chamber, means for feeding a batt of hay into said feed chamber, and means for driving the pellet forming gears at a rate of speed which is dependent upon the rate of feed of hay in the batt for formation of successive pellets having substantially constant density.

15. In a hay pelletizing machine the combination comprising a pair of pellet forming gears having meshed teeth providing clearance for the formation of successive pockets at the roots of the teeth as the gears revolve, stationary upper and lower cover plates arranged flatly adjacent opposite the sides of said gears and defining with said cover plates an inwardly tapering feed chamber, means for feeding a batt of hay into said feed chamber, and means for driving the pellet forming gears at a rate of speed which is dependent upon the rate of feed of hay in the batt for formation of successive pellets having substantially constant density, said teeth being of involute shape so that a substantially closed pocket is formed prior to the arrival at the dead center position resulting in the pinching off of trailing fibers.

16. In a hay pelletizing machine the combination comprising a pair of pellet forming gears having meshed teeth providing clearance for the formation of successive pockets at the roots of the teeth as the gears revolve, stationary upper and lower cover plates arranged flatly adjacent the opposite sides of said gears and defining with said cover plates an inwardly tapering feed chamber, means for feeding a batt of hay into said feed chamber, means for driving the pellet forming gears at a rate of speed which is dependent upon the rate of feed of hay in the batt for formation of successive pellets having substantially constant density, and means synchronized with the gears for knocking out the pellets from between the teeth upon movement beyond the dead center position.

17. In a hay pelletizing machine the combination comprising a pair of flat pellet forming gears having meshing teeth with root clearance defining pellet forming spaces, cover plates on opposite sides of the gears and enclosing the entryway between said gears to define a feed chamber, and means including knocker shafts having radial knocker arms at the output side of the gears with the shafts being directly coupled to the gears for knocking out the pellets formed between the teeth, and means for driving the gears.

18. In a hay pelletizing machine the combination comprising a pair of flat pellet forming gears having meshing teeth with root clearance defining pellet forming pockets, cover plates snugly embracing opposite sides of the gears to enclose the pellet forming pockets and to define a feed chamber, a knocker arm shaft associated with each of the gears on the output side, each of said shafts having a radial arm for swinging between the teeth to knock the pellets therefrom, and means for driving the shafts in synchronism with the gears.

19. In a hay pelletizing machine the combination comprising means including a frame for field transport, conveyor means supported on said frame in position to receive hay and defining a first feed chamber in which the hay is compressed in a vertical direction as it is transported, means including a pair of intermeshing toothed gears defining a second feed chamber in which the hay is compressed in a horizontal direction, the teeth of said pair of pelletizing gears cooperating to form the partially compressed hay from the second feed chamber into compact pellets, driving means for the conveyor and gears, and means for controlling the speed of rotation of the gears in accordance with the amount of hay passing through said feed chambers.

References Cited in the file of this patent

UNITED STATES PATENTS

| | | |
|---|---|---|
| 1,094,320 | Evans | Apr. 21, 1914 |
| 2,716,317 | McClellan | Aug. 30, 1955 |
| 2,716,318 | Skromme | Aug. 30, 1955 |
| 2,861,610 | Ramsay | Nov. 25, 1958 |

FOREIGN PATENTS

| | | |
|---|---|---|
| 861,665 | Germany | Jan. 5, 1953 |